United States Patent
Tsuchiya et al.

(10) Patent No.: US 7,778,758 B2
(45) Date of Patent: Aug. 17, 2010

(54) CRUISE CONTROL SYSTEM FOR A VEHICLE

(75) Inventors: Kazutoshi Tsuchiya, Hitachinaka (JP); Hiroshi Sakamoto, Hitachi (JP); Masato Imai, Hitachinaka (JP); Tatsuya Ochi, Tokai (JP); Takaomi Nishigaito, Kasumigaura (JP); Masao Sakata, Yokohama (JP); Masafumi Naito, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 11/867,192

(22) Filed: Oct. 4, 2007

(65) Prior Publication Data

US 2008/0091327 A1    Apr. 17, 2008

(30) Foreign Application Priority Data

Oct. 5, 2006    (JP)    ............................. 2006-273663

(51) Int. Cl.
G06F 7/00    (2006.01)

(52) U.S. Cl. .......................... 701/93; 701/210; 382/104
(58) Field of Classification Search .................. 701/93, 701/210; 382/104
See application file for complete search history.

(56) References Cited

U.S. PATENT DOCUMENTS

| | | | | |
|---|---|---|---|---|
| 5,774,824 A | * | 6/1998 | Streit et al. | 701/207 |
| 6,134,509 A | * | 10/2000 | Furusho et al. | 702/167 |
| 6,292,752 B1 | * | 9/2001 | Franke et al. | 701/300 |
| 6,807,287 B1 | * | 10/2004 | Hermans | 382/104 |
| 2002/0095246 A1 | * | 7/2002 | Kawazoe | 701/1 |
| 2005/0113995 A1 | * | 5/2005 | Oyaide | 701/36 |

FOREIGN PATENT DOCUMENTS

JP    04-257740 A    9/1992

* cited by examiner

*Primary Examiner*—Khoi Tran
*Assistant Examiner*—Brian J Broadhead
(74) *Attorney, Agent, or Firm*—Crowell & Moring LLP

(57) ABSTRACT

This invention provides a vehicle cruise control system which, during recognition of a shape of a road extending in a frontward direction of host vehicle, can calculate the road shape rapidly and accurately from a positional relationship with respect to the host vehicle. The system includes at least: a position change detector that detects, from information on the road existing in the frontward direction of the vehicle, a horizontal distance from a line segment orthogonal to a traveling direction vector of the vehicle, to a centerline of the road, the detection being conducted at a plurality of measuring points in an extending direction of the traveling direction vector; a road shape recognizer that identifies the shape of the road from data relating to linearity of changes in each of the horizontal distances, the linearity data being obtained by the position change detector; and a cruise controller that controls traveling of the vehicle according to results of the identification by the road shape recognizer.

6 Claims, 11 Drawing Sheets

ENLARGED DIAGRAM

CRUISE CONTROL SYSTEM FOR A VEHICLE

BACKGROUND OF THE INVENTION

1. Field of the Invention

The present invention relates generally to cruise control systems for vehicles, and more particularly, to a vehicle cruise control system suitable for application to an automobile, for example.

2. Description of the Related Art

For example, during cruise control of an automobile which uses an automatic vehicle-to-vehicle control system (adaptive cruise control), cruise control that changes, for example, the speed and/or other factors of the vehicle according to the particular shape of the road is required for improved driving comfort and safety for the driver. Implementing this requires highly accurate environmental recognition that uses, for example, a car navigation system, cameras, radars, or the like.

The reason is that for example, when a vehicle traveling on a straight road approaches a curved road, there is a need, before making the vehicle travel through the curved road, to detect the start of the curved road in front thereof with a prior understanding of the road shape and control the vehicle for a slowdown to a speed at which the vehicle can travel safely.

Means of recognizing the road shape in this manner includes the steps of, for example: extracting a traveling lane marking from the image information supplied from a camera provided for frontward monitoring in the traveling direction of the vehicle; setting, for example, any three points as measuring points on an image of the edge of the lane marking; defining the coordinates of each measuring point by image processing; calculating the radius of curvature of the lane marking by assigning the coordinates of each point to a general equation of a circle; and identifying the shape of the road having the cornering radius estimated from the above calculation results.

Such technology relating to the recognition of the road shape is disclosed in, for example, JP-A-04-257740.

SUMMARY OF THE INVENTION

As outlined above, the foregoing conventional technology for recognizing the road shape is by, for example, assigning the coordinates of any three measuring points on an image of the road to an equation of a circle, solving three simultaneous equations for associated coefficients, and estimating the radius of curvature of the curve. This means that when the road shape is calculated, no consideration is given to the relationship with respect to the position of the host vehicle.

Calculating the road shape considering the positional relationship with respect to the position of the host vehicle requires recognizing the road shape as soon as possible. Drifting of the vehicle body during traveling or changes in the traveling position of the vehicle, however, immediately change the above coordinates, thus causing inevitable difficulty with rapid recognition of the road shape.

In addition, the difficulty with rapid recognition of the road shape impedes the appropriate cruise control of the host vehicle, based on information relating to the road shape.

An object of the present invention is to provide a vehicle cruise control system capable of calculating rapidly and accurately a shape of a road present ahead in a traveling direction of a vehicle having the cruise control system.

Another object of the present invention is to provide a vehicle cruise control system capable of conducting appropriate cruise control by recognizing a shape of a road present ahead in a cruise direction of a vehicle having the cruise control system.

Some of typical aspects of the present invention disclosed herein are listed below.

(1) A vehicle cruise control system according to the present invention includes, for example:

a position change detector which detects, from information relating to a road present ahead in a traveling direction of a vehicle, horizontal distances from line segments orthogonal to a vector pointing in the same direction as the traveling direction of the vehicle, to a centerline of the road, at a plurality of measuring points in an extending direction of the traveling direction vector; and a road shape recognizer which identifies a shape of the road from data relating to linearity of changes in each horizontal distance obtained by the position change detector; and a cruise controller which conducts cruise control of the vehicle according to identification results by the road shape recognizer.

(2) A vehicle cruise control system according to the present invention assumes, for example, the configuration described in item (1) above and includes:

an attitude parameter arithmetic unit that calculates an attitude parameter of the vehicle from a steering angle and vehicle speed of the vehicle;

a path parameter arithmetic unit that calculates a path parameter indicative of a traveling path of the vehicle, from the attitude parameter calculated by the attitude parameter arithmetic unit; and a position change corrector that corrects the horizontal distance detected by the position change detector, according to the attitude parameter calculated by the attitude parameter arithmetic unit.

(3) Another vehicle cruise control system according to the present invention assumes, for example, the configuration described in item (2) above, and the path parameter arithmetic unit includes:

a first arithmetic unit that calculates a first path parameter from the horizontal distance detected by the position change detector;

a second arithmetic unit that calculates a second path parameter from the attitude parameter computed by the attitude parameter arithmetic unit; and an output selector that selectively outputs either the first path parameter calculated by the first arithmetic unit, or the second path parameter calculated by the second arithmetic unit, to the position change corrector according to the road shape identified by the road shape recognizer.

(4) Yet another vehicle cruise control system according to the present invention assumes, for example, the configuration described in item (1) above and includes an element by which the plurality of measuring points detected by the position change detector are each adjusted in terms of distance with respect to each of other measuring points adjacent to the detected measuring points such that the detected measuring points will all be positioned on an image indicative of the road shape.

(5) A further vehicle cruise control system according to the present invention assumes, for example, the configuration described in item (2) above and includes car navigation; wherein the attitude parameter calculated by the attitude parameter arithmetic unit, and the path parameter calculated by the path parameter arithmetic unit are displayed on a screen intended for the car navigation.

(6) A further vehicle cruise control system according to the present invention assumes, for example, the configuration described in item (2) above and includes car navigation to store map data; wherein the path parameter calculated for the map data by the path parameter arithmetic unit, and the map data are updated in accordance with the road shape identified by the road shape recognizer.

(7) A further vehicle cruise control system according to the present invention includes, for example:

a position change detector which detects, from information relating to a road present ahead in a traveling direction of a vehicle, a horizontal distance between a centerline of the road and a line segment orthogonal to a vector pointing in the same direction as the traveling direction of the vehicle, the detection being conducted at a plurality of measuring points in an extending direction of the traveling direction vector;

a path parameter arithmetic unit that calculates at least a yaw angle from the horizontal distance calculated by the position change detector; and a car navigation function into which map data is stored.

The yaw angle, after being calculated by the path parameter arithmetic unit, is used for map matching to adapt a host vehicle position to the map data supplied from the car navigation.

Embodiments of the present invention are not limited to the above configurations, and each embodiment can be changed or modified in various forms or terms in a range not departing from a technical concept or philosophy the invention.

According to the vehicle cruise control system of the present invention, the shape of the road existing ahead in the traveling direction of the host vehicle can be calculated rapidly and accurately with a relative position thereof with respect to the host vehicle position taken into account during recognition of the road shape.

Furthermore, according to the vehicle cruise control system of the present invention, accompanying with the rapid and accurate recognition of the shape of the road existing ahead in the traveling direction of the host vehicle, it is possible to attain appropriate cruise control.

DESCRIPTION OF THE PREFERRED EMBODIMENTS

Embodiments of a vehicle cruise control system according to the present invention are described below using the accompanying drawings.

(Total System Configuration)

Figure 1:
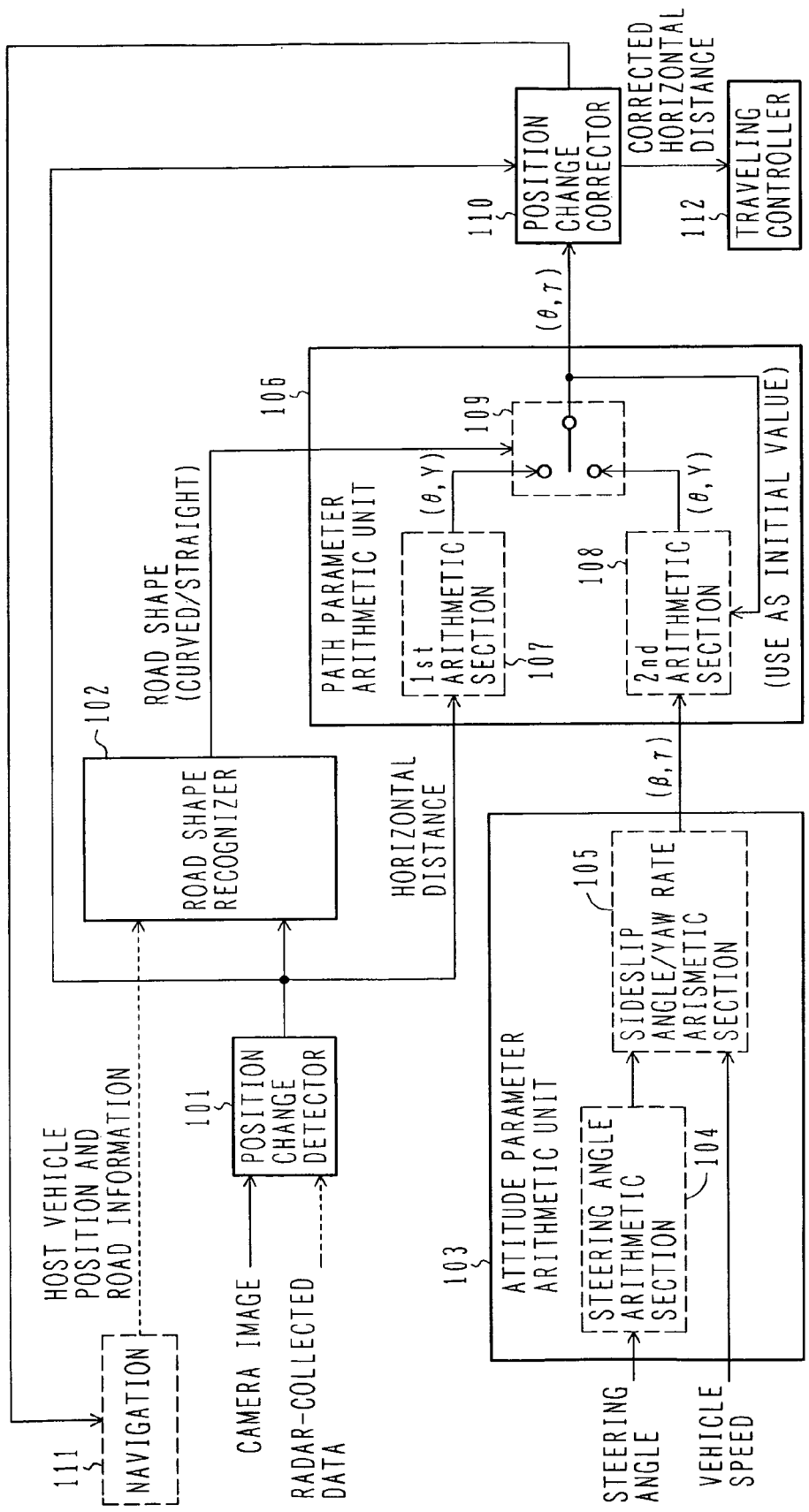
FIG. 1 is a schematic block diagram showing an embodiment of a total configuration of a cruise control system for an automobile according to the present invention.

FIG. 1 is a schematic block diagram showing an embodiment of a total configuration of a vehicle cruise control system according to the present invention. This figure shows by way of example the cruise control system mounted in an automobile, for example. This cruise control system for an automobile is adapted so that various processes described later herein are pre-programmed into a computer mounted in the automobile, and the program is constructed to be cyclically executed at predetermined time intervals.

Referring first to FIG. 1, a position change detector 101 is adapted to calculate for each of plural measuring points a distance from a centerline of a road present ahead in a traveling direction of the vehicle having the cruise control system (hereinafter, this vehicle is referred to as the host vehicle), to a vector agreeing with the traveling direction of the host vehicle (hereinafter, this vector is referred to as the traveling direction vector). The above distance from the centerline of the road to the traveling direction vector of the host vehicle is equivalent to a distance from the centerline of the road to a line segment extending in a direction orthogonal to the traveling direction vector. For convenience's sake, this distance may be defined as a horizontal distance herein.

During recognition of, for example, lane markings of the road from the host vehicle's frontward road image information acquired by a camera (or the like) mounted in or on the host vehicle, the above horizontal distance is computed at the above-mentioned measuring points set as reference positions distant by, for example, 10 m, 20 m, and 30 m in the frontward direction of the host vehicle along the traveling direction vector.

The recognition of the lane markings (or the like) of the road may use, for example, a radar (laser and millimeterwave), instead of the above-mentioned camera, to collect and calculate reflection intensity data as well as a distance to a target such as the lane markings. Camera images and radar-collected data may be combined as another alternative method of recognizing the lane markings or the like. It is only important that information that allows identification of a shape of the road existing in the frontward direction of the vehicle should be acquired. The lane markings may be, for example, yellow lane markings, guardrails, road edges, or the like, and the horizontal distance may be a distance with respect to a yellow lane marking, a guardrail, a road edge, or the like.

During the detection of the horizontal distance by the position change detector 101, if the road shape includes a section that causes loss of the measuring points from the road image, inconvenience can be avoided by adjusting a frontward detection range of the road in the traveling direction. That is to say, the position change detector 101 is adapted so that in order that the plurality of measuring points defined by the position change detector will all be positioned on an image indicative of the road shape, distances from these measuring points to other measuring points adjacent thereto are arbitrarily adjusted by an adjusting element not shown. Further details of the position change detector 101 will be described using FIG. 2.

The cruise control system also has a road shape recognizer 102, which receives own-vehicle position road information from a car navigation system 111 and also receives, from the position change detector 101, information on the above horizontal distance. The road shape recognizer 102 is constructed to recognize a road shape that allows discrimination of whether the road existing in the frontward direction of the host vehicle is a straight road or a curved one based on the information from the position change detector 101 or the car navigation system 111.

In the embodiment of FIG. 1, the recognition of the road shape by the road shape recognition 102 is based on the information from the position change detector 101 or on the information from the car navigation system 111. This recognizing method ensures accurateness of the road shape. However, only either of the two kinds of information may be used. Further details of the road shape recognizer 102 will be described using FIGS. 3 and 4.

An attitude parameter arithmetic unit 103 is adapted to acquire information on a steering angle (steering wheel angle) and vehicle speed of the host vehicle, from a constituent element (not shown), such as a sensor, that is mounted in or on the host vehicle. Also, the attitude parameter arithmetic unit 103 includes a steering angle arithmetic section 104 and a sideslip angle/yaw rate arithmetic section 105.

Information on the steering angle is input to the steering angle arithmetic section 104, which then computes the steering angle of the host vehicle. Information on the computed steering angle is input to the sideslip angle/yaw rate arithmetic section 105, which then calculates a sideslip angle $\beta$ and yaw rate $\gamma$ of a gravitational center of the vehicle from the information relating to the vehicle speed and the steering angle. The sideslip angle $\beta$ is represented as an angle formed by a velocity vector and vehicle body direction vector of the host vehicle. The sideslip angle $\beta$ and the yaw rate $\gamma$ may be collectively termed the attitude parameter for convenience's sake in this Specification. This attitude parameter is recognized as a parameter having a nature which allows a value of this parameter to be used as a basis for estimating what path the host vehicle will follow during future traveling.

While, as described above, the yaw rate $\gamma$ is calculated by the computation of the sideslip angle/yaw rate arithmetic section 105 in the present embodiment, the cruise control system does not always need to be constructed as such. Instead, an independent yaw rate sensor may be provided in or on the host vehicle and an output from the yaw rate sensor may be used to detect the yaw rate $\gamma$. Further details of the attitude parameter arithmetic section 103 will be described using FIG. 5.

A path parameter arithmetic unit 106 calculates path parameters $(\theta, Y)$ from the horizontal distance detected by the position change detector 101, the road shape recognized by the road shape recognizer 102, and the attitude parameter computed by the attitude parameter arithmetic unit 103. The path parameters are each formed up of a yaw angle $(\theta)$ equivalent to an angle formed by the centerline of the road and the vehicle body direction vector, and a traveling position Y of the host vehicle.

That is to say, the path parameter arithmetic unit 106 schematically includes a first arithmetic section 107, a second arithmetic section 108, and an output selector 109. Information on the horizontal distance is input from the position change detector 101 to the first arithmetic section 107, by which path parameters $(\theta, Y)$ relating to a straight road are then calculated and information on these calculated values is input to the output selector 106. Information on the attitude parameter is input from the attitude parameter arithmetic unit 103 to the second arithmetic section 108, by which path parameters $(\theta, Y)$ relating to a curved road are then calculated and information on these calculated values is input to the output selector 106.

The output selector 106 is adapted to receive road shape recognition flag information from the road shape recognizer 102 and use this road shape recognition information (straight/curved road identification flag) to transfer an output of either the first arithmetic section 107 or the second arithmetic section 108, to a position change corrector 110 (described below).

Further details of the path parameter arithmetic section 106 will be described using FIG. 6.

Although this is not explicitly shown in FIG. 1, for example, the attitude parameter calculated by the attitude parameter arithmetic unit 103 or the path parameters calculated by the path parameter arithmetic unit 106 may be displayed, for example, on a display screen of the navigation system 111 in order to provide convenience for situation judgment by a driver of the vehicle.

On the basis of the path parameters $(\theta, Y)$ that the path parameter arithmetic unit 106 has calculated, the position change corrector 110 corrects the horizontal distance that the position change detector 101 has detected. Further details of the position change corrector 110 will be described using FIG. 7.

A cruise controller 112 is adapted to drive, for example, a transmission, an engine, and other sections not shown, and the driving is based on information of the horizontal distance that the position change detector 101 has calculated, that is, on the corrected horizontal distance. Information on the corrected horizontal distance is calculated as a value in which a detection error associated with the uncorrected horizontal distance has been reduced according to a particular attitude of the vehicle, whereby the transmission, the engine, and the like can be reliably controlled.

In the automobile cruise control system of the present embodiment, an output from the position change corrector 110 is input to the car navigation system 111. This ensures that map data stored within the car navigation system 111 is properly corrected using the vehicle path of the host vehicle. Details of the correction will be described later using FIG. 9.

(Position Change Corrector 101)

Figure 2:
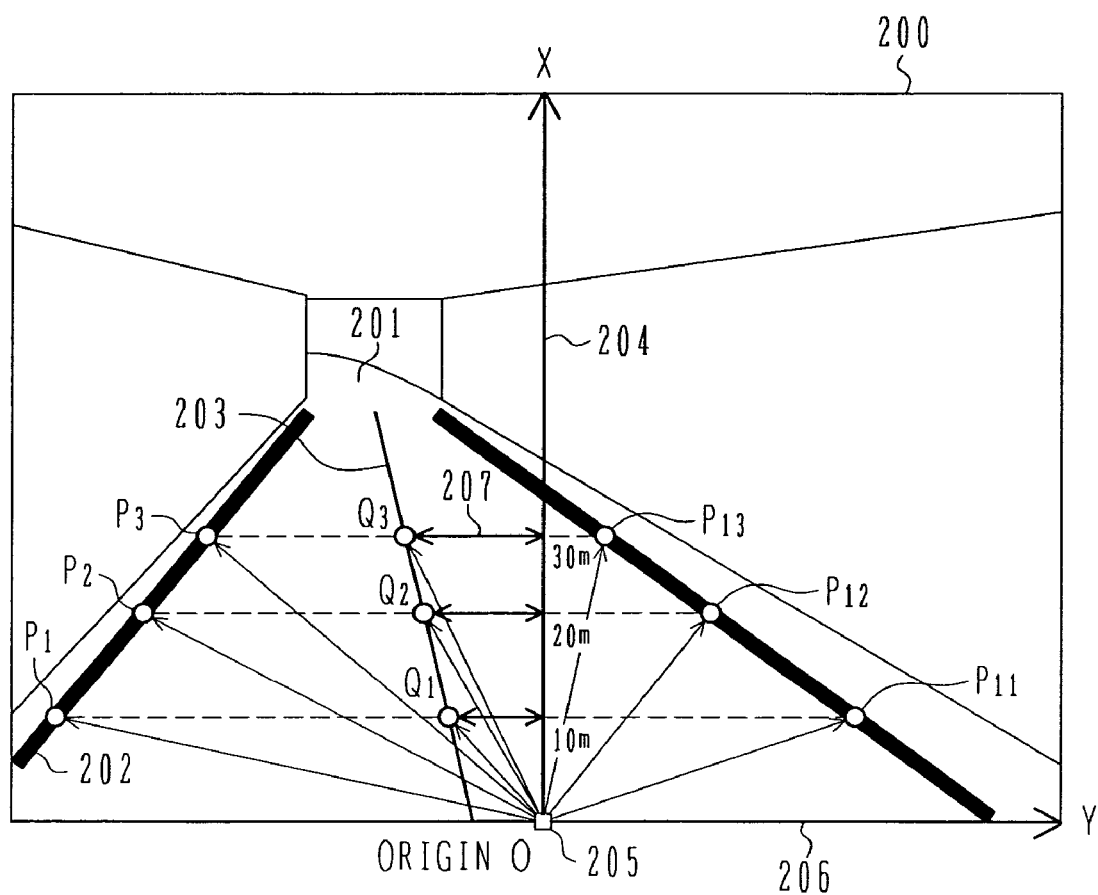
FIG. 2 is an explanatory diagram showing an example of processing by the position change detector shown in FIG. 1.

FIG. 2 is an explanatory diagram of processing by the position change detector 101. FIG. 2 shows a camera image 200 of a forward road 201, acquired when the host vehicle travels on the road 201. The camera image 200 is an image acquired by a camera mounted frontward in or on the host vehicle, and as described above, the image information is input to the position change detector 101. The camera image 200 has a Y-axis 206 matched to a horizontal direction of the image, an X-axis 204 matched to a vertical direction of the image, and a coordinate system established with a coordinate origin O at the host vehicle position 205.

By image processing of the camera image 200, the position change detector 101 detects edges of lane markings 202 present at both sides of the road 201, and sets up position vectors P11, P12, P13, P21, P22, and P23 at a plurality of measuring points (distant by, for example, 10 m, 20 m, and 30 m from the host vehicle position 205) in an extending direction of each detected lane marking 202.

Position vectors Q1, Q2, and Q3 are computed from the position vectors P11, P12, P13, P21, P22, P23, using following expression (1), and the road centerline 203 is calculated from the position vectors Q1, Q2, Q3:

$$Qn=(P1n+P2n)/2(n=1,2,3) \qquad (1)$$

The X-axis 204 shown in FIG. 2 is synonymous with the direction of the camera and the traveling direction vector of the host vehicle, so Y-coordinates of the position vectors Q1, Q2, Q3 at the road center 203 are equivalent to the horizontal distance 207. The road centerline 203 can thus be detected via the horizontal distance 207 by such image processing.

Information on the horizontal distance 207 is output to the road shape recognizer 102 and the path parameter arithmetic unit 106.

(Road Shape Recognizer 102)

Figure 3:
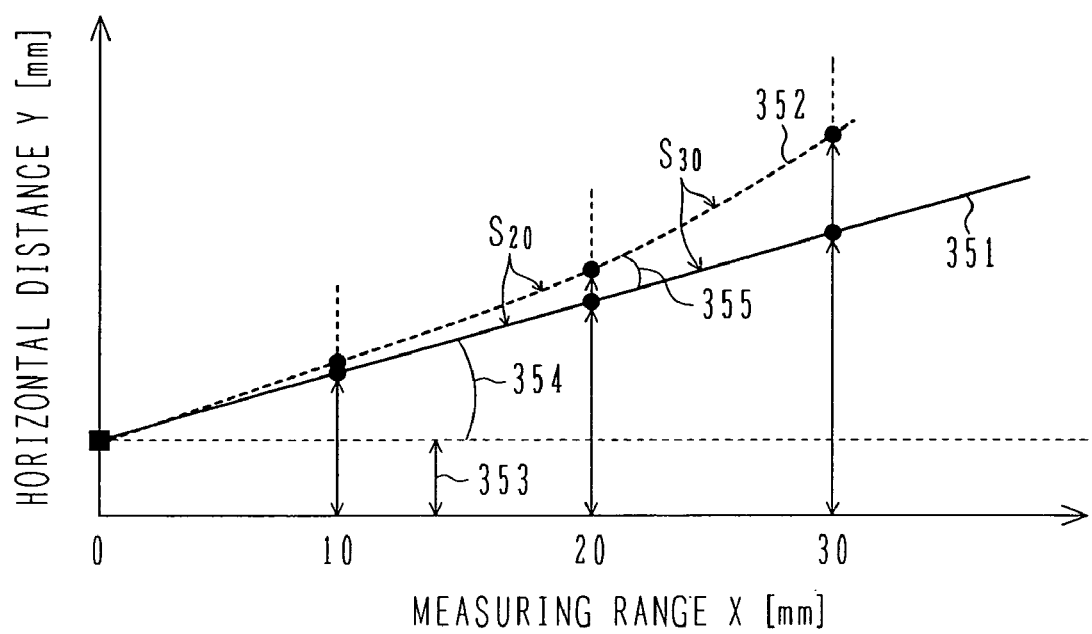
FIG. 3 is an explanatory diagram showing an example of processing by the road shape recognizer shown in FIG. 1.

FIG. 3 is an explanatory diagram of processing by the road shape recognizer 102. FIG. 3 is a graph with a horizontal axis taken for a measuring range X matched to an x-axis direction of the camera image 200, and with a vertical axis taken for the horizontal distance 207 appropriate for the measuring range X.

In FIG. 3, the horizontal distance 207 is expressed as a Y-coordinate of a position vector Qn (this Y-coordinate is equivalent to a distance from the X-axis 204 to the road centerline 203). For a straight road, therefore, a change rate (inclination) of the horizontal distance is invariant and as denoted by a solid line 351, takes a linear form. For a curved road, since the road centerline 203 is curvilinear, the change rate (inclination) of the horizontal distance is variant and as denoted by a broken line 352, takes a nonlinear form.

For these reasons, the road shape can be recognized by computing the change rates of the horizontal distances of each zone split by the measuring points distant by, for example, 10 m, 20 m, and 30 m from the host vehicle position on the solid line 351 or the broken line 352, and analyzing the linearity of the change rates of the horizontal distances of adjacent zones.

Inclinations S20 of the solid line 351 and the broken line 352, between the measuring points at 10 m and 20 m from the host vehicle position, and inclinations S30 between the measuring points at 20 m and 30 m can be computed using following expressions (2) and (3), respectively:

$$S20=(Y20-Y10)/(X20-X10) \qquad (2)$$

$$S30=(Y30-Y20)/(X30-X20) \qquad (3)$$

Information on the road shape thus calculated is output to the path parameter arithmetic unit 106.

Figure 4:
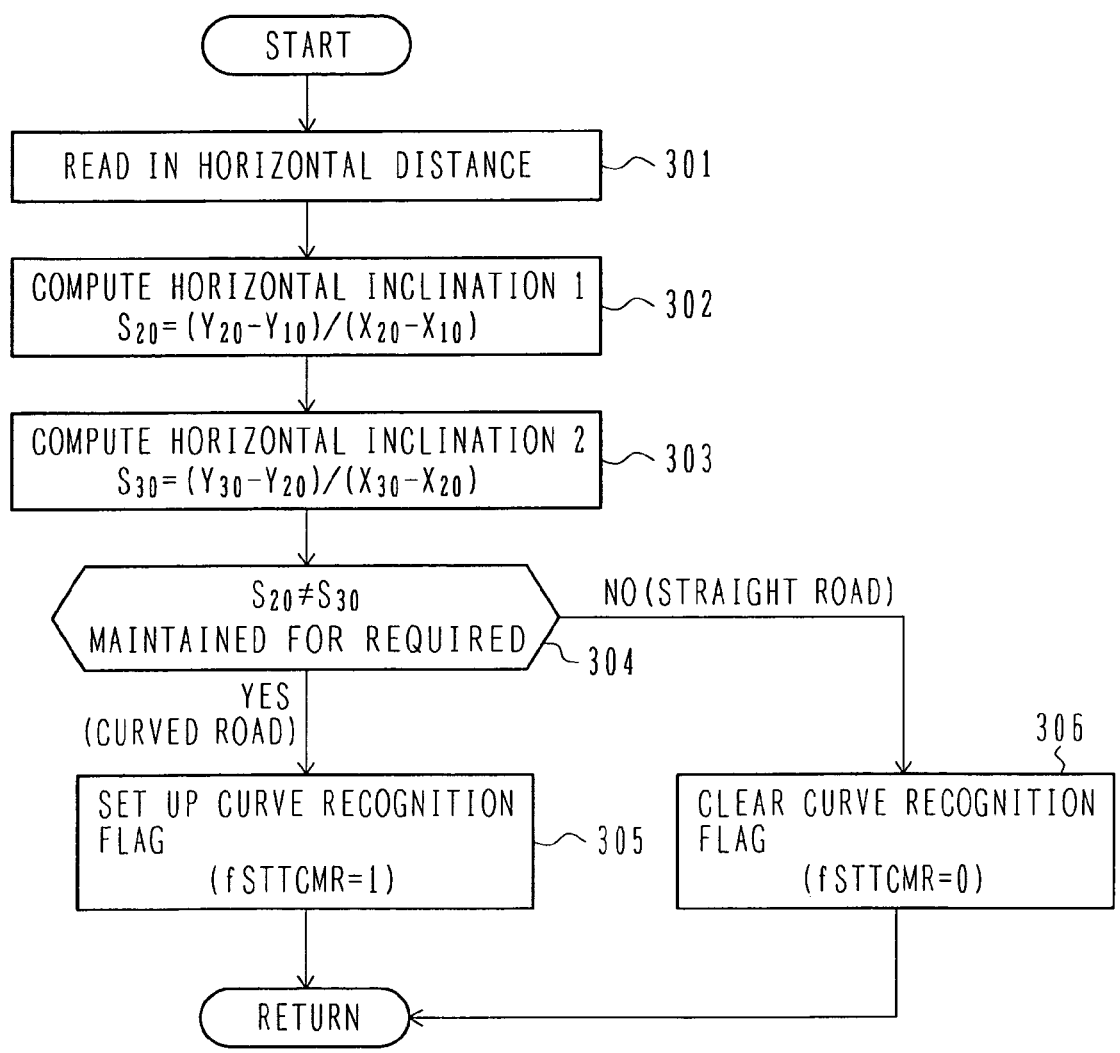
FIG. 4 is a flowchart showing an example of processing by the road shape recognizer shown in FIG. 1.

FIG. 4 is a flowchart showing an example of processing by the road shape recognizer 102.

First, the horizontal distance that the position change detector 101 has calculated is read in step 301. After this, control is transferred to step 302, in which step, inclination 1 (S20) of the horizontal distance is then calculated per foregoing expression (2). Control is further transferred to step 303, in which step, inclination 2 (S30) of the horizontal distance is then calculated per foregoing expression (3).

Next in step 304, the inclination 1 (S20) and inclination 2 (S30) that were calculated in steps 302 and 303 are compared and whether a state of S20≠S30 has continued for a required time (T) is judged. If the judgment criterion in step 304 holds, recognition of a curved road is judged to be underway. After this, control is transferred to step 305, in which step, a flag fSTTCMR indicating that curve recognition is underway is then set up to terminate processing. If the judgment criterion in step 304 does not hold, recognition of a straight road is judged to be underway. After this, control is transferred to step 306, in which step, the curve recognition flag fSTTCMR is then cleared to terminate processing.

In this way, it becomes possible to recognize the road shape that allows straight road/curved road discrimination according to the horizontal distance which the position change detector 101 has calculated. A parameter of the road shape recognition flag is output to the path parameter arithmetic unit 106.

Road shape recognition based on the horizontal distance calculated in the above manner by the position change detector 101 may be reduced in accuracy by factors such as instability of the vehicle attitude. More specifically, as shown in FIG. 3, since attitude parameters such as a yaw angle 354 and an offset quantity 353 indicating the traveling position of the host vehicle, and road shape parameters such as an angle 355 indicating the road shape (in the figure, curved road) are simultaneously included in the horizontal distance calculated by the position change detector 101, variations in the offset quantity 353 and the yaw angle 354 may render accurate road shape recognition impossible.

Accordingly, corrections based on the arithmetic results by the attitude parameter arithmetic unit 103 are conducted for the offset quantity 353 and the yaw angle 354.

(Attitude Parameter Arithmetic Unit 103)

Figure 5:
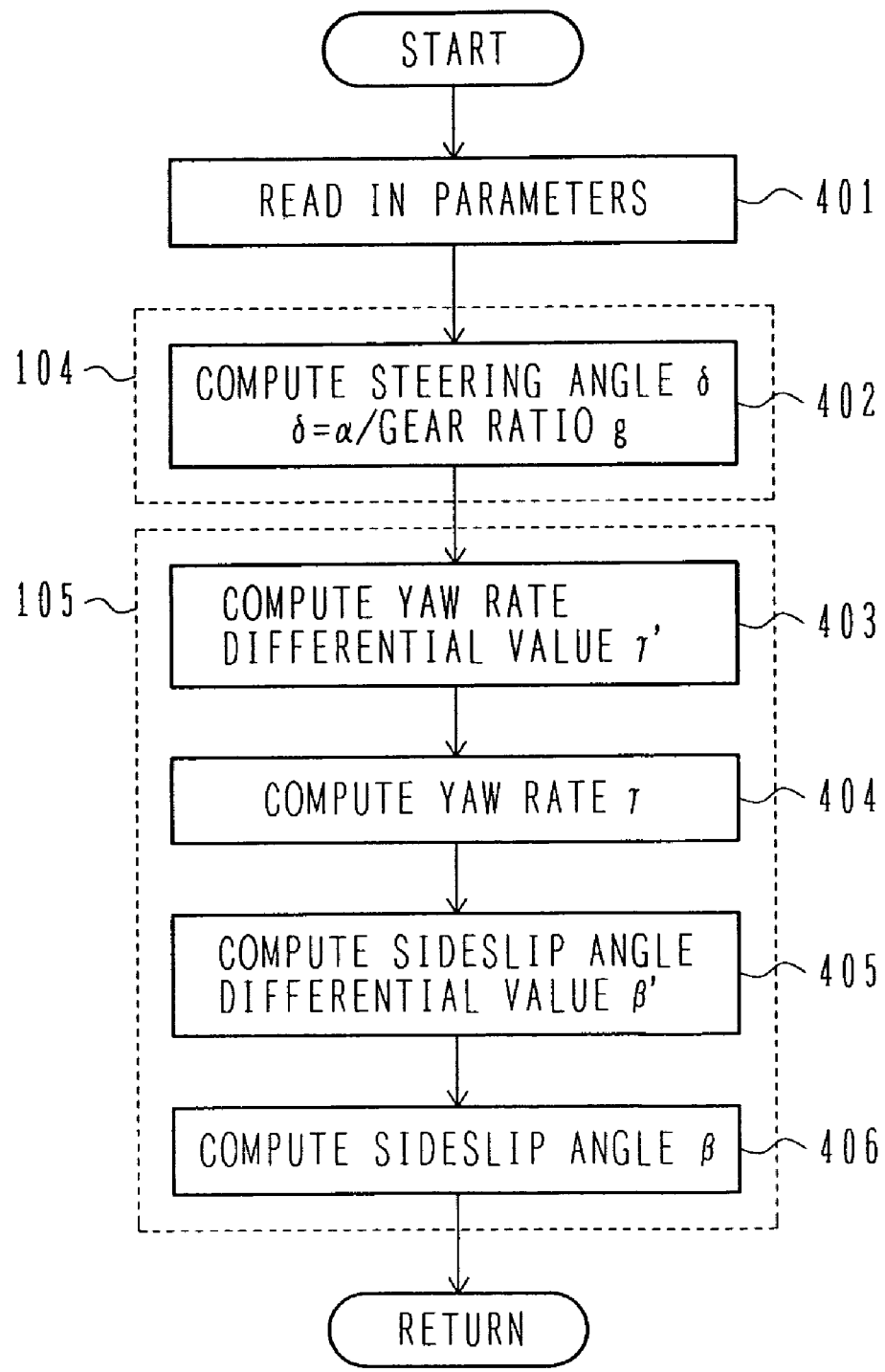
FIG. 5 is a flowchart showing an example of processing by the attitude parameter arithmetic unit shown in FIG. 1.

FIG. 5 is a flowchart showing an example of processing by the attitude parameter arithmetic unit 103.

First, parameters such as a steering angle α (steering wheel angle) and vehicle speed of the host vehicle are read in step 401. After this, control is transferred to step 402, in which step, a steering angle δ is then calculated based on the steering angle α and a steering ratio g using expression (4) shown below.

$$\delta = \Delta/g \qquad (4)$$

Next in step 403, a yaw rate differential value γ' based on steering angle δ and vehicle speed VSP is calculated using kinetic equation (5) of yawing motion, and then control is transferred to step 404.

$$\gamma'=\{2 1fKf\delta-2(1fKf-1rKr)\beta z-2(1f2Kf+1r2Kr)\gamma z/Vsp\}/I \qquad (5)$$

where γz denotes the yaw rate γ that was computed before one period, and βz denotes the sideslip angle β that was computed before one period.

In step 404, yaw rate γ based on the yaw rate differential value γ' that was calculated in step 403 is calculated using expression (6).

$$\gamma=\gamma z+\gamma' \times \text{integration coefficient} \qquad (6)$$

where the integration coefficient is a value determined according to computing period.

Next in step 405, a sideslip angle differential value β' based on steering angle δ and vehicle speed VSP is calculated using kinetic equation (7) of transverse vehicle motion, and then control is transferred to step 406.

$$\beta'=[2Kf\delta-2(Kf+Kr)\beta z-\{mVsp+2(1fKf-1rKr)/VSP\}\gamma]/mVSP \qquad (7)$$

where βz denotes the sideslip angle β that was computed before one period, and "m" denotes an inertial mass of the vehicle.

In step 406, sideslip angle β based on the sideslip angle differential value β' that was calculated in step 405 is calculated using expression (8), thereby to terminate processing.

$$\beta=\beta z+\beta' \times \text{integration coefficient} \qquad (8)$$

where the integration coefficient is a value determined according to computing period.

Referring here to the above arithmetic operations, the arithmetic operation in expression (4) is conducted by the steering angle arithmetic section 104 shown in FIG. 1, and the arithmetic operation in expression (5) or (8) is conducted by the sideslip angle/yaw rate arithmetic section 105 shown in FIG. 1.

In this manner, based on sensor-detected steering angle $\alpha$ and vehicle speed VSP, the sideslip angle $\beta$ and yaw rate $\gamma$ that are attitude parameters can be calculated via the attitude parameter arithmetic unit 103, and the attitude of the host vehicle can be estimated. Values of the sideslip angle $\beta$ and yaw rate $\gamma$ are output to the path parameter arithmetic unit 106.

(Path Parameter Arithmetic Unit 106)

Figure 6:
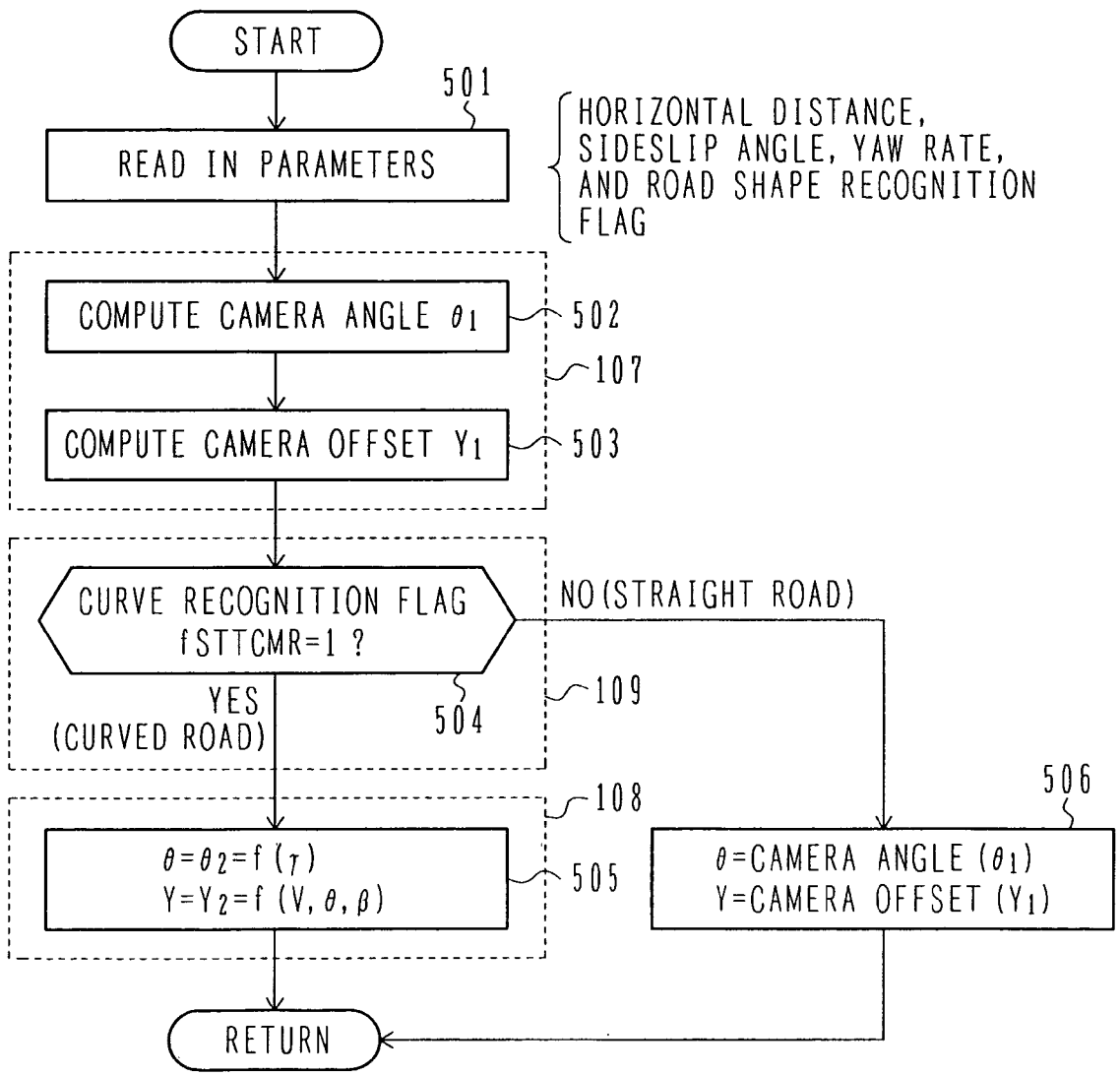
FIG. 6 is a flowchart showing an example of processing by the path parameter arithmetic unit shown in FIG. 1.

FIG. 6 is a flowchart showing an example of processing by the path parameter arithmetic unit 106.

First, the horizontal distance calculated by the position change detector 101, the sideslip angle $\beta$ and yaw rate $\gamma$ calculated by the attitude parameter arithmetic unit 103, and a parameter of the road shape recognition flag (or the like) recognized by the road shape recognizer 102 are read in step 501. Control is then transferred to step 502.

In step 502, the horizontal distance change rates S20 and S30 of each zone, shown in FIG. 3, are used to calculate an average value (SAVE) of the horizontal distance change rates, as shown in expression (9), and additionally, the average value (SAVE) of the horizontal distance change rates is used to calculate a camera angle $\theta 1$ as shown in expression (10).

$$SAVE=(S20+S30)/2 \quad (9)$$

$$\theta 1=\tan-1(SAVE) \quad (10)$$

The camera is installed pointing in the traveling direction of the host vehicle (i.e., in a longitudinal direction of the vehicle body), and the camera angle $\theta 1$ is equivalent to the angle formed between the road centerline and the traveling direction vector.

Next in step 503, expressions (11a), (11b), and (11c) are used to calculate y10, y20, and y30, respectively, from the horizontal distance Y and the average horizontal distance change rate SAVE that was calculated in step 502. Values y10, y20, and y30 are offset quantities associated with the measuring points at 10 m, 20 m, and 30 m, respectively, from the host vehicle position. Next, camera offset Y1 is calculated using expression (12), and then control is transferred to step 502.

$$y10=Y10-SAVE\times 10 \quad (11a)$$

$$y20=Y20-SAVE\times 20 \quad (11b)$$

$$y30=Y30-SAVE\times 30 \quad (11c)$$

$$Y1=(y10+y20+y30)/3 \quad (12)$$

Camera offset Y1 is the distance from the road centerline 203 to the traveling position of the host vehicle, and denotes an average value of segments of the solid line 351 and broken line 352 in FIG. 3.

It is judged in step 504 whether a value of the curve recognition flag fSTTCMR that the road shape recognizer 102 has processed is 1. If the judgment criterion in step 504 holds, the recognition of a curved road is judged to be underway. After this, control is transferred to step 505, in which step, path parameters ($\theta$, Y) associated with the curved road are then calculated from expressions (13) and (14) to terminate processing.

The yaw rate that the attitude parameter arithmetic unit 103 has calculated using expression (6) is expressed as $\gamma$, and a quantity equivalent to the traveling position, calculated using expression (15), is expressed as YVSP. Also, the integration coefficient shown in expression (15) is a value determined according to computing period.

$$\theta=\theta z+\gamma \quad (13)$$

$$Y=Yz+YVSP \quad (14)$$

$$YVSP=VSP\times\sin(\beta+\theta)\times \text{integration coefficient} \quad (15)$$

If the judgment criterion in step 504 does not hold, the recognition of a straight road is judged to be underway. After this, control is transferred to step 506, in which step, the camera angle $\theta 1$ and camera offset Y1 calculated above using expressions (10) and (12), that is, the path parameters ($\theta$, Y) shown in expressions (16) and (17) for the straight road are then calculated to terminate processing.

$$\theta=\theta 1 \text{(camera angle)} \quad (16)$$

$$Y=Y1 \text{(camera offset)} \quad (17)$$

Of the arithmetic operations described above, those of expression (9) or (12) are conducted by the first arithmetic section 107 shown in FIG. 1, and those of expression (13) or (15) are conducted by the second arithmetic section 108 shown in FIG. 1.

In expression (9) or (12), the first arithmetic section 107 uses only the horizontal distance information from the position change detector 101 to conduct calculate the path parameters relating to a straight road. In expression (13) or (15), the second arithmetic section 108 uses the information from the attitude parameter arithmetic unit 103 to conduct calculations concerning a curved road. In that case, although the path parameters relating to a straight road can likewise be calculated by using the second arithmetic section 108, the first arithmetic section 107 for calculating the path parameters relating to a straight road is provided separately from the second arithmetic section 108 to implement more rapid and easier computations. It goes without saying, however, that the separate provision of the first arithmetic section 107 is not always required.

In this manner, the path parameters ($\theta$, Y) matching the road shape can be calculated from the horizontal distance calculated by the position change detector 101, the attitude parameters calculated by the attitude parameter arithmetic unit 103, and the road shape recognition flag (or the like) recognized by the road shape recognizer 102. Calculated path parameters ($\theta$, Y) are output to the position change corrector 110.

(Position Change Corrector 110)

Figure 7:
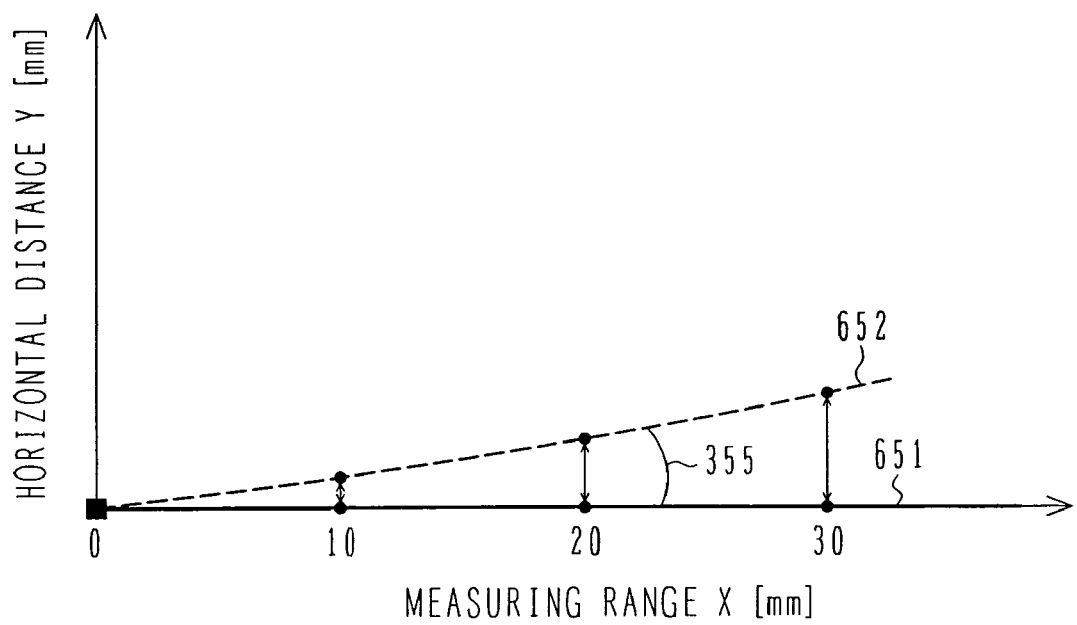
FIG. 7 is an explanatory diagram showing an example of processing by the position change corrector shown in FIG. 1.

FIG. 7 is an explanatory diagram of processing by the position change corrector 110. FIG. 7 is a graph in which the horizontal distance that has been corrected using the information relating to the path parameters ($\theta$, Y) input from the path parameter arithmetic unit 106 is represented in association with a measuring range. This graph with the measuring range X plotted on its horizontal axis and the horizontal distance Y plotted on its vertical axis is keyed to FIG. 3.

A solid line 651 in FIG. 7 is keyed to the solid line 351 of FIG. 3, and the horizontal distance represented by the solid line 651 is shown as correction results on the horizontal distance represented by the solid line 351. A broken line 652 in FIG. 7 is keyed to the broken line 352 of FIG. 3, and the horizontal distance represented by the broken line 652 is shown as correction results on the horizontal distance represented by the broken line 352.

In other words, the solid line 651 and broken line 652 in FIG. 7 are shown to denote the horizontal distances obtained by correcting the offset quantity 353 and the yaw angle 354 on the basis of the path parameter (θ, Y) information, with respect to the solid line 351 and broken line 352 in FIG. 3. Accordingly, the solid line 651 in FIG. 7 is depicted in matched form with respect to the centerline of the straight road, and the broken line 652 is depicted in matched form with respect to the centerline of the curved road.

Correcting the horizontal distance in this way with the position change corrector 110 by using path parameters makes it possible to reduce a horizontal distance detection error that depends upon the particular vehicle attitude, and improve road shape recognition accuracy. Corrected horizontal distance information from the position change corrector 110 is input to the cruise controller 112, by which, for example, the transmission, the engine, and other sections not shown are then controlled.

(Vehicle Slowdown Control Based on Road Shape Recognition)

Figure 8:
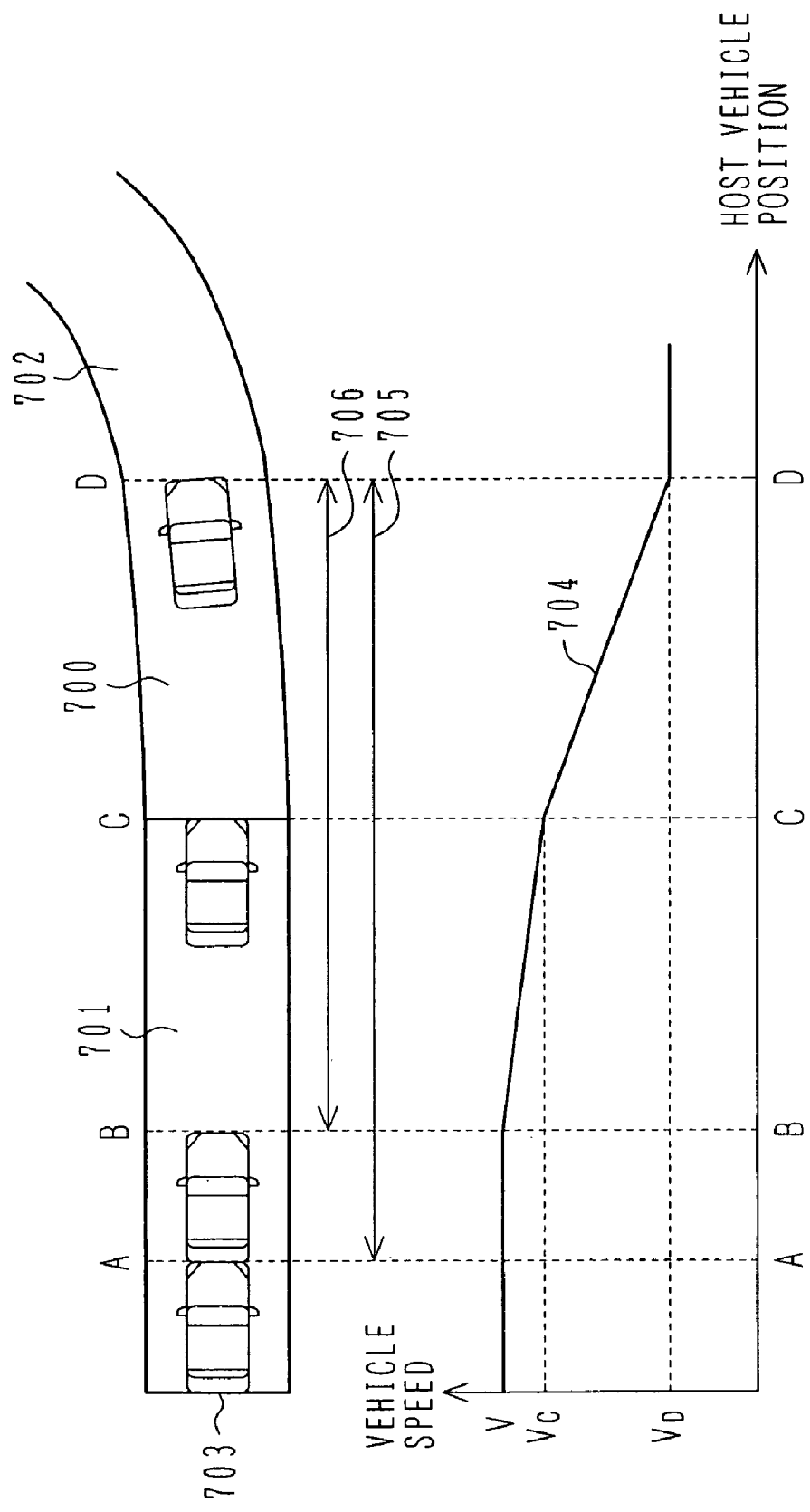
FIG. 8 is an explanatory diagram showing an example in which a vehicle is controlled during an approach to a curved road so as to slow down according to recognition results supplied from the road shape recognizer shown in FIG. 1.

FIG. 8 is an explanatory diagram showing an example in which the vehicle is controlled to slow down according to the road shape recognition results obtained by the road shape recognizer 102 when the vehicle approaches a curved road. An upper half of FIG. 8 assumes that the host vehicle 703 travels on a road 700 including a straight road 701 and a curved road 702 which extends therefrom. A lower half of FIG. 8 is a polygonal line graph that shows changes in the vehicle speeds at various traveling positions (A, B, C, D) of the vehicle 703.

After the curved road 702 existing frontward in the traveling direction has been recognized at position A in FIG. 8, the cruise controller 112 computes a distance 705 from this position to the curve (hereinafter, this distance is called the curve outreach). The curve outreach 705 is equivalent to a distance from current position A of the host vehicle to a start (position D) of the curved road 702.

After the recognition of the curved road 702 existing frontward in the traveling direction, the cruise controller also computes a desired initial cornering speed VD according to a particular radius of curvature of the curved road 702, and computes a slowdown distance 706 according to the particular desired velocity. The slowdown distance 706 is equivalent to a distance required for the slowdown from the vehicle speed of the host vehicle at current position B or the speed that has been controlled for the straight road 701, to a speed at the start (position D) of the curved road 702. The vehicle speed of the host vehicle at current position B or the speed controlled for the straight road 701 is shown as VA in FIG. 8.

After the vehicle 703 traveled at the speed VA and passed through position B, when the curve outreach 705 becomes shorter than the slowdown distance 706, the vehicle 703 is slowed down according to the desired speed VD that has been computed by the cruise controller. A solid line 704 in the graph shows the slowdown state. In this case, the vehicle is preferably slowed down, for example, at two different rates so that a slowdown rate AD in the C-D zone is slightly greater than a slowdown rate AC of the B-C zone. A feeling of uneasiness of the driver during the slowdown will be relievable by so doing.

In this way, the vehicle speed is reduced at the slowdown rate AC up to an arrival of the vehicle at position C (or the speed VC), and reduced at the slowdown rate AD up to an arrival at position D, and after the speed of the vehicle 703 at position D has been reduced to the desired initial cornering speed VD at the start (position D) of the curved road 702, driving comfort and safety can be improved by maintaining constant-speed traveling of the vehicle 703 at the desired speed VD and then slowing down the vehicle to an appropriate speed in immediate front of the curve. When the vehicle 703 is traveling on the straight road leading to the passageway shown in FIG. 8, the above slowdown control is avoided under unnecessary situations, and constant-speed traveling and the speedup or slowdown control appropriate for a particular situation can be executed.

(Correcting the Map Data of the Car Navigation System 111)

Figure 9:
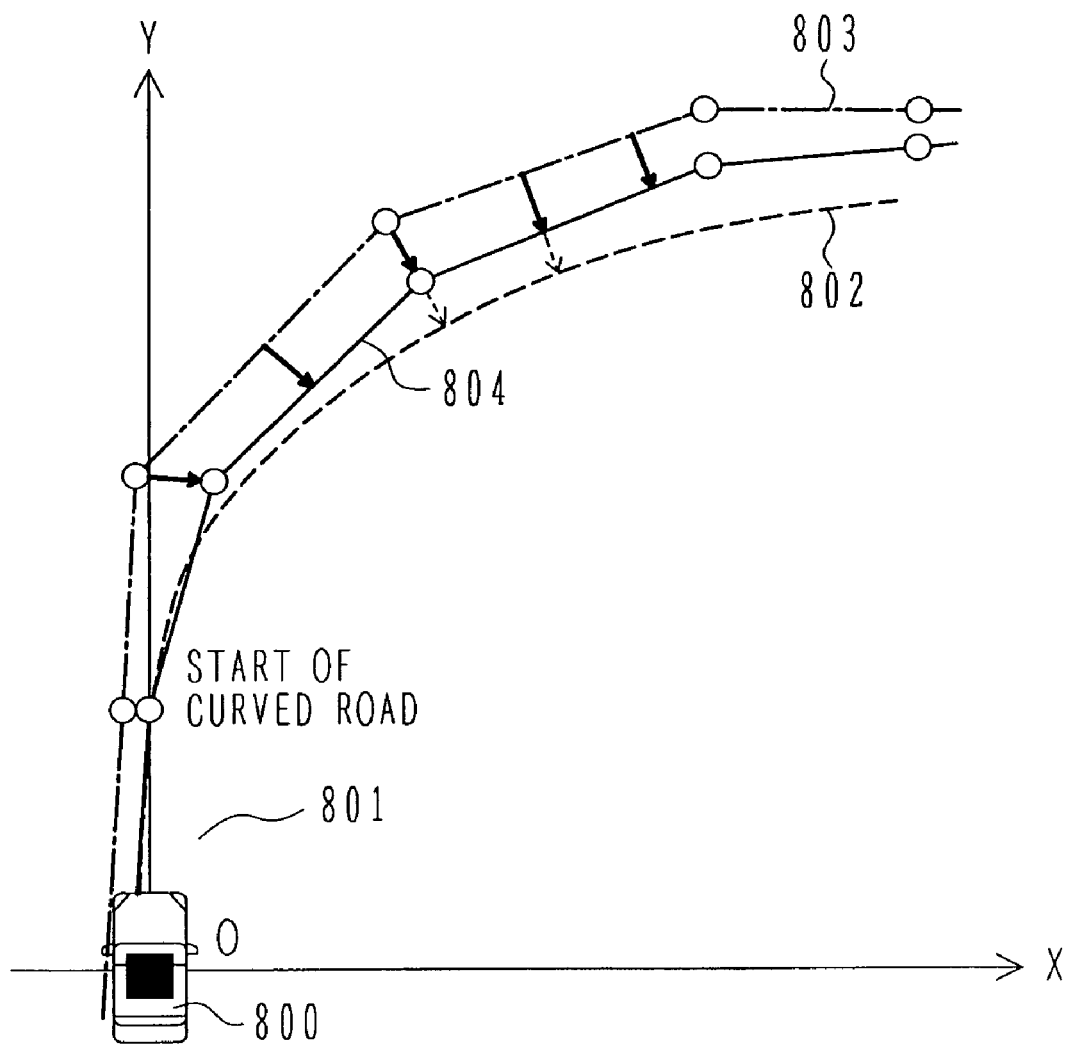
FIG. 9 is an explanatory diagram showing an example of a method of using a traveling path of host vehicle to correct the car navigation map data shown in FIG. 1.

FIG. 9 is an explanatory diagram of a method of correcting the map data of the car navigation system 111 by utilizing the vehicle path of the host vehicle. As shown in FIG. 1, the map data is corrected by signal input from the position change corrector 110 to the navigation system 111, and the correction is conducted as follows on the basis of corrected horizontal distance and vehicle path information:

FIG. 9 assumes that a vehicle 800, the host vehicle, is positioned at an origin of an XY coordinate system, with a broken line 802 denoting a centerline of an actual road on which the vehicle 800 is to travel. A single-dotted line 803 in FIG. 9 denotes a road equivalent to the actual road, the former road being present on the map data. The single-dotted line 803 is drawn at an offset position with respect to the broken line 802. This is because position information relating to the road on the map data may contain a slight error, compared with position information of the actual road.

Since the horizontal distance that has been calculated by the position change corrector 110 is equivalent to the road centerline, a path of the vehicle in a direction of an X-axis can be computed using the corrected horizontal distance. In addition, a path of the vehicle in a direction of a Y-axis can be computed by calculating the sideslip angle β with the attitude parameter arithmetic unit 103, calculating the yaw angle θ (for the straight road) from the horizontal distance calculated by the position change corrector 110, or calculating the yaw angle θ (for the curved road) with the path parameter arithmetic unit 106, and assigning these calculated values to following expression (18):

$$Y=Yz+VSP \times \sin(\beta+\theta) \times \text{integration coefficient} + Ymn \quad (18)$$

where the integration coefficient is a value determined according to computing period and Ymn is a measuring range (10 m, 20 m, 30 m) of the camera.

When the vehicle 800 is traveling on the straight road, the vehicle paths (X, Y) in both X- and Y-directions can be calculated using the corrected horizontal distance calculated by the position change corrector 110, and the correction of the map data is executed using the corrected horizontal distance. During traveling on the curved road, the camera 801 recognizes the start of the curved road, an XY orthogonal coordinate system with an origin at the host vehicle position during the recognition of the start of the curved road is established, the vehicle path (X) in the X-axis direction is calculated from the corrected horizontal distance, and the vehicle path (Y) in the Y-axis direction is calculated by assigning the sideslip angle β and the yaw angle θ to above expression (18).

The thus-computed vehicle path data (X, Y) of the host vehicle is used to correct coordinates of the road denoted by the single-dotted line 803 having an error in the map data of the car navigation system, into coordinates of the road denoted by the solid line 804 associated with the computed vehicle path data (X, Y).

Repeatedly executing this correction process with each travel of the vehicle on the same road makes it possible to match the road denoted by the single-dotted line 803, to the road denoted by the broken line 802. Corrected map information can therefore be used to implement prior recognition of accurate geographic information on a distant road (e.g., a curved road, a radius of curvature thereof, and more), and the appropriate, safe, and comfortable cruise control of the automobile according to the particular shape of the road.

(Map Matching of the Car Navigation System 111)

Figure 10:
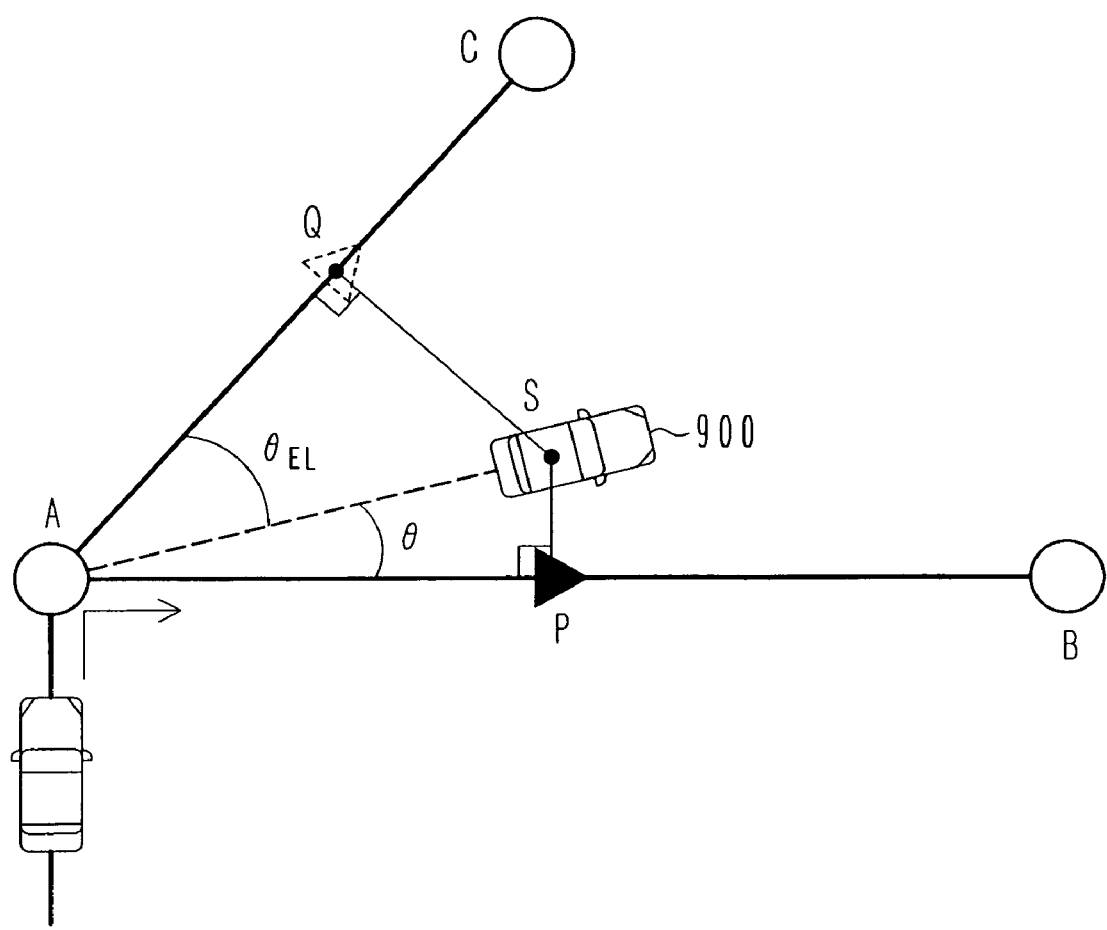
FIG. 10 is an explanatory diagram showing an example of a method of car navigation map matching based on a yaw angle calculated by the path parameter arithmetic unit shown in FIG. 1.

FIG. 10 is an explanatory diagram of a car navigation map-matching method using the yaw angle θ.

Navigation map data is usually constituted by coordinates (hereinafter, referred to as nodes) at required positions, and line segments (hereinafter, referred to as links) that connect the nodes. FIG. 10 is a diagram assuming that on a road expressed with nodes A, B, C and links AB, AC on map data, a vehicle 900, the host vehicle, is turning to the right at right angles at the node A and traveling on the road corresponding to the link AB.

In FIG. 10, the vehicle 900 is traveling at position S slightly shifted under an actual situation for reasons such as an unstable lateral attitude of the vehicle body or a lane change of the vehicle. In this case, when a global positioning system (GPS) is in a non-receiving state, map matching must be executed to fit the position of the host vehicle to a correct position P on the link AB.

That is to say, the link AC existing near a position S is extracted together with the link AB, and a length of a perpendicular line SP drawn from the position S to the link AB, and a length of a perpendicular line SQ drawn from the position S to the link AC are calculated. Next, angle θEL is calculated using information of the links AC and AB of the map data stored within the car navigation system 111, and the yaw angle θ. The angle θEL is a value obtained by subtracting the yaw angle θ from an angle formed between the links AC and AB.

Next, these values are used to calculate an error cost EAB of the link AB and an error cost EAC of the link AC, the error costs being defined by following expressions (19) and (20), respectively:

$$EAB = K1 \times |\theta| + K2 \times |SP| \quad (19)$$

$$EAC = K1 \times |\theta EL| + K2 \times |SQ| \quad (20)$$

where K1 and K2 are weighting coefficients.

During map matching, the link with the smallest error cost value obtained from the calculations in expressions (19) and (20) is selected and a point at which the selected link and the perpendicular line intersect (i.e., a leg of the perpendicular line of the line segment) is corrected as the host vehicle position.

Traditionally, since the yaw angle θ is a value estimated using the steering angle δ, impacts of tire flexure or slight side slipping of the vehicle 900 may cause errors in the yaw angle θ. In this case, if the angle between the links AB and AC is small, the error cost values will be difficult to compare, and as a result, the inconvenience will occur that in spite of the vehicle currently traveling on the road corresponding to the ink AB, the vehicle is mis-judged to be traveling on the link AC.

In contrast to this, as described above, the present embodiment detects the yaw angle via the first arithmetic section 107 using the horizontal distance information detected by the position change detector 101, so the yaw angle on the straight road can be calculated as a very accurate value. For this reason, map-matching accuracy of the car navigation system can be improved.

Figure 11:
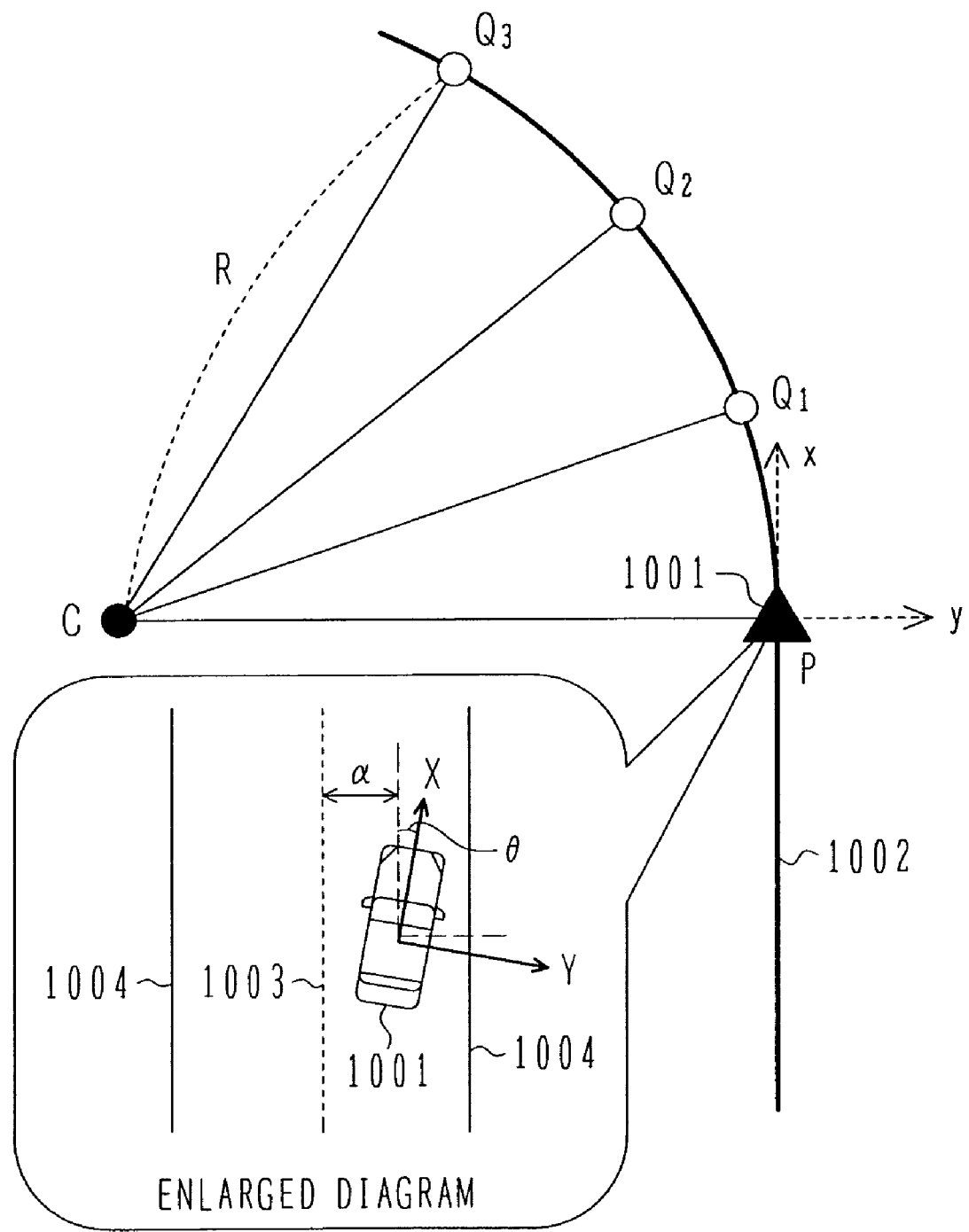
FIG. 11 is a schematic diagram showing a positional relationship established during camera recognition of a curve having a constant curvature.

A method of calculating the offset α (distance from the centerline of the road to the traveling position of the host vehicle) in a curve with a constant radius of curvature, and the yaw angle θ (the angle between the road centerline and the vehicle body direction vector) is described below using FIG. 11. FIG. 11 is a schematic diagram showing a positional relationship derived when a curve with a constant radius of curvature is recognized using a camera.

In FIG. 11, after the host vehicle 1001 traveling on a road 1002 has arrived at position P (starting point of a curve having a constant curvature) and approached the curve, the position change detector 101 detects horizontal position coordinates of points Q1, Q2, and Q3. At this time, the values of points Q1, Q2, and Q3 in an "XY" coordinate system with a reference in the traveling direction of the host vehicle are expressed by following expressions (21) to (23):

$$Q1 = (X10, Y10) \quad (21)$$

$$Q2 = (X20, Y20) \quad (22)$$

$$Q3 = (X30, Y30) \quad (23)$$

For the curve of a constant curvature, since the road shape can be expressed by an equation of a circle, if central coordinates C are defined as (A, B), expressions (24) to (26) below can be obtained.

$$(X10-A)2 + (Y10-B)2 = R2 \quad (24)$$

$$(X20-A)2 + (Y20-B)2 = R2 \quad (25)$$

$$(X30-A)2 + (Y30-B)2 = R2 \quad (26)$$

Since the positions of Q1, Q2, Q3 are known via the position change detector 101, the central coordinates C and the curvature radius R can be calculated by solving the above simultaneous equations.

Next, consider an "xy" coordinate system with a reference as a line tangent to the road centerline at point P. In this coordinate system, the central coordinates C of the circle are (O, R). As shown in the enlarged diagram of FIG. 11, if the road centerline and lane markings are drawn as 1003 and 1004, respectively, the coordinate system (x, y) is generated by rotating the coordinate system (X, Y) through the yaw angle θ and then translating this rotated coordinate system through the offset a in the y-axis direction. Coordinate conversion of the center C of the circle, therefore, makes it possible to obtain the simultaneous equation of following expression (27) and thus to calculate the yaw angle θ and the offset α:

$$\begin{pmatrix} \cos\theta & \sin\theta \\ -\sin\theta & \cos\theta \end{pmatrix} \begin{pmatrix} A \\ B \end{pmatrix} + \begin{pmatrix} 0 \\ \alpha \end{pmatrix} = \begin{pmatrix} 0 \\ R \end{pmatrix} \quad (27)$$

As set forth above, using the horizontal distance that the position change detector 101 has calculated makes it possible to compute the distance (offset) from the centerline of the road to the traveling position of the host vehicle, and the yaw angle formed between the road centerline and the vehicle body direction vector. In addition, computation results can be applied to correcting the horizontal positions shown in FIG. 7, and to map matching shown in FIG. 10.

What is claimed is:

1. A cruise control system for a vehicle, comprising:
a position change detector which detects, from information on a road existing in a frontward direction of the vehicle, a horizontal distance from a line segment orthogonal to a traveling direction vector of the vehicle, to a centerline of the road, the detection being conducted at a plurality of measuring points in an extending direction of the traveling direction vector;
a road shape recognizer which identifies a shape of the road from data relating to linearity of changes in each of the horizontal distances, the linearity data being obtained by said position change detector; and
a cruise controller which controls traveling of the vehicle according to results of the identification by said road shape recognizer.

2. The vehicle cruise control system according to claim 1, further comprising:
an attitude parameter arithmetic unit which calculates an attitude parameter from a steering angle and vehicle speed of the vehicle;
a path parameter arithmetic unit which calculates, from the attitude parameter calculated by the attitude parameter arithmetic unit, a path parameter indicative of a traveling path of the vehicle; and
a position change corrector which corrects, according to the path parameter calculated by the path parameter arithmetic unit, the horizontal distance detected by said position change detector.

3. The vehicle cruise control system according to claim 2, wherein the path parameter arithmetic unit includes:
a first arithmetic section which calculates a first path parameter from the horizontal distance detected by said position change detector;
a second arithmetic section which calculates a second path parameter from the attitude parameter calculated by the attitude parameter arithmetic unit; and
an output selector which selectively outputs either the first path parameter calculated by the first arithmetic section, or the second path parameter calculated by the second arithmetic section, to the position change corrector according to the road shape identified by said road shape recognizer.

4. The vehicle cruise control system according to claim 1, further comprising:
an adjusting element by which, in order that the plurality of measuring points detected by said position change detector will all be positioned on an image of the road, the detected measuring points are each adjusted in terms of distance with respect to each of other measuring points adjacent to the detected measuring points.

5. The vehicle cruise control system according to claim 2, further comprising a car navigation function, wherein:
the attitude parameter calculated by the attitude parameter arithmetic unit, and the path parameter calculated by the attitude parameter arithmetic unit are displayed on a screen created by the car navigation function.

6. The vehicle cruise control system according to claim 2, further comprising a car navigation function including a capability to store map data, wherein:
the map data is updated in accordance with, in addition to the path parameter calculated for the map data by the path parameter arithmetic unit, the road shape identified by said road shape recognizer.

* * * * *